United States Patent [19]

Schoendube

[11] Patent Number: 4,604,673
[45] Date of Patent: Aug. 5, 1986

[54] DISTRIBUTION TRANSFORMER WITH SURGE PROTECTION DEVICE

[75] Inventor: Charles W. Schoendube, Hickory, N.C.

[73] Assignee: General Electric Company, King of Prussia, Pa.

[21] Appl. No.: 673,214

[22] Filed: Nov. 20, 1984

Related U.S. Application Data

[63] Continuation of Ser. No. 609,661, May 14, 1984, abandoned.

[51] Int. Cl.⁴ .............................................. H02H 7/04
[52] U.S. Cl. ......................................... 361/38; 361/35
[58] Field of Search ...................... 361/35, 38, 39, 40, 361/127, 128

[56] References Cited

U.S. PATENT DOCUMENTS 2,276,855  3/1942  Meador.
2,703,852  3/1955  Meador.
3,466,504  9/1969  Hart.
4,153,921  5/1979  Kresge et al. .................... 361/38 X

FOREIGN PATENT DOCUMENTS 138214  10/1980  Japan.
80109   7/1981  Japan.

OTHER PUBLICATIONS

Paper by McMillen, Schoendube, Caverly entitled Susceptibility of Distribution Transformers to Low-Voltage Side Lightning Surge Failure," presented at IEEE/PES winter power meeting, Feb. 1, 1982.

Primary Examiner—A. D. Pellinen
Assistant Examiner—Jeffrey A. Gaffin
Attorney, Agent, or Firm—William Freedman

[57] ABSTRACT

This distribution transformer is of the shell type and includes within its oil-filled tank a layer-type high voltage winding and a layer-type low voltage winding. The low voltage winding is divided into two sections with a grounded interconnection between said two sections. A metal oxide varistor device is mounted within the oil-filled tank and is connected between the high voltage terminal of the high voltage winding and ground. There is another connection between the mid-point of the varistor device and the mid-point of the high voltage winding. The varistor device so connected protects the high voltage winding against both voltage surges entering via its terminals and current surges entering via the terminals of the low voltage winding.

9 Claims, 4 Drawing Figures

DISTRIBUTION TRANSFORMER WITH SURGE PROTECTION DEVICE

This application is a continuation of application Ser. No. 609,661, filed May 14, 1984, now abandoned.

BACKGROUND

The present invention relates to electric transformers, especially distribution transformers of the overhead type, and to protective equipment therefor.

Investigations have been made in recent years of failures of common designs of single-phase overhead (pole-type) distribution transformers caused by lightning current surges. As a result of these investigations, it has been found that anomalous failures of such transformers are attributable to lightning surges entering the transformer via the normally unprotected low voltage terminals, causing failure of the high voltage coil. By "anomalous" failures is meant failures that occur despite state-of-the-art lightning protection. Thus, it was found that high voltage arrester protection of the high voltage coil by conventional arrester equipment was ineffective in avoiding this problem. Particularly affected were shell-type transformers with noninterlaced mid-grounded divided low voltage winding, i.e., of 120/240 secondary voltage rating. It appears that the damaging voltages were induced by oppositely poled current surges on each half, or section, of the divided low voltage winding.

While shell-type or core-type transformers with interlaced low voltage coils have been significantly less susceptible to surge currents of the same magnitude, it appears that the adoption in recent years of non-interlaced construction by many manufacturers of the shell-type units may account for increased premature or anomalous failures of distribution transformers.

Investigations relative to the above discussed problem are reported in detail in IEEE paper 82MW093-3 by C. W. Schoendube et al, presented in New York City in February 1982. This paper, in pages 1-9, discusses the effect of the above described surge currents on various types of transformers, and is incorporated herein by reference.

It is well-known to provide transformers with surge arresters externally of the tanks thereof to shunt the currents associated with lightning strikes to ground and thus protect the transformer elements against extreme voltage peaks by such transient surges. Aside from the fact that the usual arrester arrangements have not adequately protected distribution transformers of the above-noted non-interlaced shell type against the anomalous failures discussed, the known arrester arrangements, especially of the external type, may require relatively long leads, have a variety of mounting hardware, include porcelain or similar types of enclosures which on occasion are subject to explosion or other causes of breakage, are relatively expensive, or have other difficulties associated therewith.

OBJECTS AND SUMMARY

It is an object of the invention to provide a system for protecting electric transformers, especially distribution transformers of the overhead type, which overcomes the disadvantages of known protective systems for such apparatus.

It is a particular object of the invention to provide such a protective system for shell-type distribution transformers with non-interlaced, divided low voltage winding, and for protecting such transformers particularly against anomalous failures as above described.

Another object of the invention is to provide a protective system of the above type utilizing a lightning arrester device arranged within the transformer tank.

Still another object of the invention is to provide a protective system for the above type transformer wherein connection of the arrester device to the high voltage winding affords protection both against voltage surges entering the transformer via the terminals of the high voltage winding and against current surges entering the transformer via the terminals of the low voltage winding.

A further object of the invention is to provide a transfomer protective system of the above type which is simple, inexpensive, and readily produced without substantial modification of the transformer windings.

In carrying out the invention in one form, I provide a distribution-type, single phase transformer comprising a layer-type high voltage winding and a layer-type low voltage winding. The high voltage winding has two terminals, one being a high voltage terminal for connection to a high voltage line. The low voltage winding is divided into two sections with a grounded interconnection between said two sections. Varistor means having opposite ends and comprising a plurality of stacked varistor elements between said ends is connected from said high voltage terminal to ground. Means is provided for connecting the varistor means at not more than two points intermediate its ends to a corresponding number of points intermediate the terminals of said high voltage winding. The portions of said varistor means located between each of its opposite ends and an adjacent intermediate connection and any portion located between adjacent intermediate connections, if more than one intermediate connection is present, are substantially equal in impulse protective level rating. The corresponding portions of the high voltage winding are substantially equal in numbers of turns, whereby protection is provided for said high voltage winding against both voltage surges entering said transformer via the terminals of the high voltage winding and current surges entering via the terminals of said low voltage winding. The transformer further comprises a tank containing oil in which said windings and said varistor means are located.

In a preferred embodiment of the invention, the varistor means comprises an even number of stacked varistor elements and is connected substantially at its mid-point to substantially the mid-point of the high voltage winding.

BRIEF DESCRIPTION OF DRAWINGS

The invention will be better understood from the following description taken in conjunction with the accompanying drawings, in which.

DETAILED DESCRIPTION OF PREFERRED EMBODIMENTS

Figure 1:
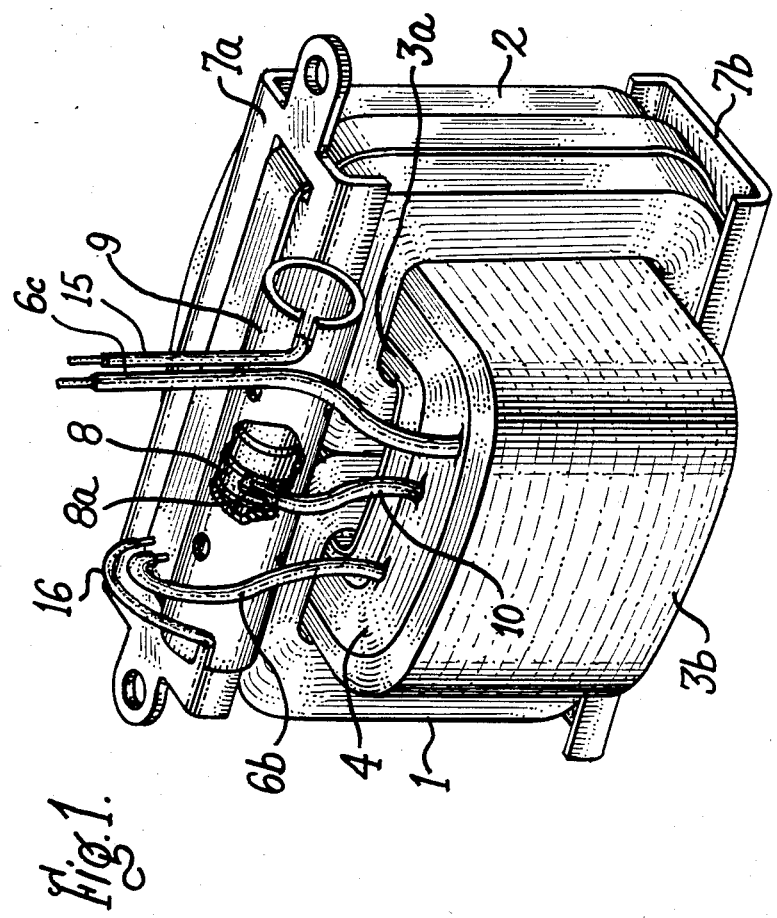
FIG. 1 is a perspective view of the internal components of a shell-type distribution transformer having a surge protection device in accordance with one form of the invention.

Referring now to the drawings, and particularly to FIG. 1, there is a shown a shell-type distribution transformer embodying one form of the present invention and comprising a pair of side-by-side magnetic cores 1 and 2 of generally rectangular form having adjacent legs surrounded by high voltage winding 4 and low voltage winding 3a, 3b, as shown. The parts are held in assembly by upper and lower clamps 7a, 7b. The low voltage (secondary) winding is divided into two electrically connected sections, inner section 3a and outer section 3b, arranged concentrically with high voltage winding 4 radially on opposite sides thereof. Typically, the windings of a distribution transformer are formed of a plurality of concentrically arranged layers with suitable insulation disposed between the layers. These layers may be formed of coils of insulated wire comprising many turns in each layer, or they may be formed of a helically wound conductive strip having a width equal to the coil, or winding, height. Typical materials for the wire and strips are copper and aluminum.

Figure 2:
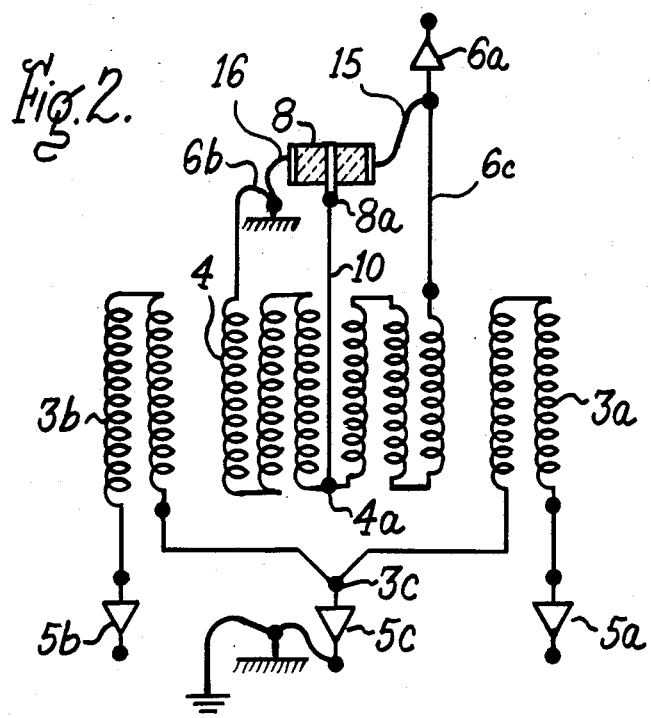
FIG. 2 is a circuit diagram pertaining to the transformer shown in FIG. 1.

As seen in FIGS. 1 and 2, the high voltage winding 4 has terminals 6b and 6c at its opposite ends. Terminal 6c is a high voltage terminal adapted to be connected through a bushing 6a to a high voltage line. In the illustrated embodiment, the other terminal 6b is connected to ground.

As seen in the FIG. 2 circuit diagram, showing a typical grounded wye shell-type transformer structure with 120/240 volt secondary rating, the two secondary winding sections, which have substantially the same number of turns, have bushing terminals 5a, 5b respectively for connection to the service entrance of a residence or the like, and have a common connection at their junction or interconnection 3c through bushing 5c to ground. As understood in the art, the divided low voltage winding is of the non-interlaced type. The term "non-interlaced" as applied to two low voltage winding sections of a shell type transformer means that all the layers of one winding section are located together and are separate from all the layers of the other winding section.

As explained above, distribution transformers of this type have been found susceptible to high voltage coil failures from lightning strikes which impress oppositely poled current surges on each section of the divided low voltage winding, thereby inducing a damaging distribution of voltage within the high voltage winding, as shown in FIGS. 7 and 8 of the above-mentioned IEEE paper 82MW093-3. It has been found that merely connecting a lightning arrester to the high voltage winding from line to ground does not protect against this phenomenon.

In accordance with one form of the invention, and as best illustrated in FIG. 2, this problem has been satisfactorily overcome by connecting a varistor 8, typically formed of a stack of zinc oxide discs, from a terminal of high voltage winding 4 to ground and simply connecting the varistor stack at its mid-point 8a by lead 10 to the mid-point 4a of high voltage winding 4, thereby limiting the peak voltage of the distribution to the discharge voltage of the varistor connected from that point to ground. The connection to ground, in one embodiment, is through the clamp 7a (FIG. 1), which is connected to the grounded transformer tank. Leads 15 and 16 are used for connecting the varistor stack 8 between the high voltage terminal 6c and ground.

Figure 4:
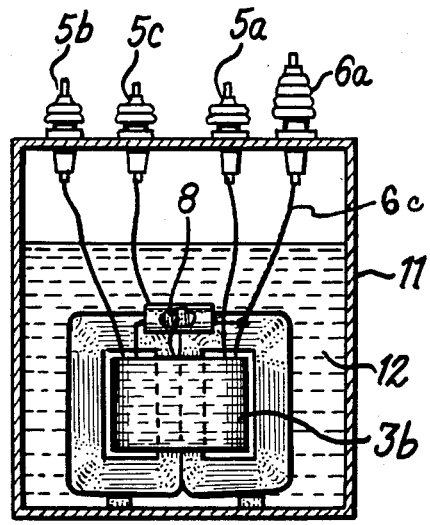
FIG. 4 is a somewhat diagrammatic view of a transformer including the components of FIG. 1 and an enclosing tank.

In a typical arrangement, varistor stack 8, enclosed in an insulating tube 9 and spring loaded therein to maintain disc contact, is suitably supported adjacent to but spaced from clamp 7a, and the entire assembly is encased in a transformer tank 11 (see FIG. 4) containing dielectric liquid 12, such as a conventional oil dielectric, in which the assembly is immersed.

Figure 3:
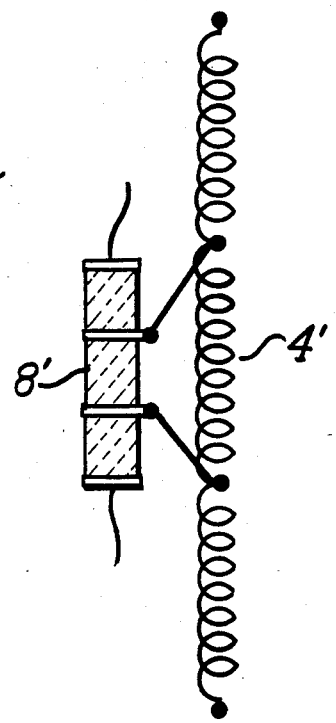
FIG. 3 is a circuit diagram of a modification of the FIG. 2 circuit.

In a typical case for a 95 kV BIL rated primary, the stack of varistor discs comprises an even number, e.g., two, of substantially identical discs, each having a voltage rating of 4.5 kV. In this case only a single mid-tap connection need be made between the varistor stack and high voltage winding. However, an odd number of substantially identical discs may be employed, such as three zinc oxide discs in 3 kV rated units. In this case, as illustrated in FIG. 3, two taps are provided on the varistor stack 8' at the ⅓ and ⅔ points thereon and connected to corresponding points on high voltage winding 4'. As used herein, in reference to this modification, the expression "multiple of three" means an odd number divisible by 3, including the number 3. In these embodiments of the invention, each disc has substantially the same impulse protective level.

While a transformer of grounded wye connection is shown in FIG. 1, it will be understood that the invention may be embodied in other arrangements, as where the varistors are connected to each primary winding in three delta-connected single-phase transformers.

The described invention provides entirely satisfactory protection against high voltage and low voltage surges without requiring expensive and cumbersome low voltage winding modifications, e.g., interlacing, which would otherwise be necessary, and provides such protection in a simple, versatile, and economical arrangement of readily available components.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new is:

1. A distribution-type single-phase transformer having a surge protection arrangement comprising;
    (a) a layer-type high voltage winding having two terminals, one being a high voltage terminal for connection to a high voltage line,
    (b) a divided low voltage winding comprising two winding sections and a grounded interconnection between said winding sections,
    (c) varistor means having opposite ends and comprising a plurality of stacked metal oxide varistor elements between said ends, said varistor means being connected from said high voltage terminal of said high voltage winding to ground,
    (d) means for connecting said varistor means at not more than two points intermediate its ends to a corresponding number of points on said high voltage winding intermediate the terminals of said high voltage winding,
    (e) the portions of said varistor means located between each of its opposite ends and an adjacent intermediate connection and any portion located between adjacent intermediate connections, if more than one intermediate connection is present, being substantially equal in impulse protective level rating,
(f) the corresponding portions of said high voltage winding being substantially equal in numbers of turns, whereby protection is provided for said high voltage winding against both voltage surges entering said transformer via the terminals of said high voltage winding and current surges entering said transformer via the terminals of said low voltage winding,
(g) said transformer further comprising an oil-filled tank in which said windings and said varistor means are located.

2. A transformer as defined in claim 1, said transformer being a shell-type transformer wherein said low voltage winding comprises an inner coil constituting one section of the low voltage winding and an outer coil of substantially equal number of turns constituting the other section of the low voltage winding, with a common grounded interconnection between said coils, said high voltage winding being arranged between said inner and outer low voltage winding coils.

3. A transformer as defined in claim 2, wherein said low voltage winding coils are non-interlaced.

4. A transformer as defined in claim 3, said varistor means being connected substantially at its mid-point, in terms of impulse protective level rating, to substantially the mid-point of said high voltage winding, in terms of turns of winding.

5. A transformer as defined in claim 3, said varistor means comprising an even number of stacked varistor elements of substantially the same impulse protective level rating and having an equal number of said elements on opposite sides of a mid-point, said mid-point being connected to substantially the mid-point of said high voltage winding, in terms of turns of winding.

6. A transformer as defined in claim 3, said varistor means being connected substantially at its $\frac{1}{3}$ and $\frac{2}{3}$ points, in terms of impulse protective level rating, to substantially the $\frac{1}{3}$ and $\frac{2}{3}$ points on said high voltage winding, in terms of turns of winding.

7. A transformer as defined in claim 3, said varistor means comprising a multiple of three stacked varistor elements and being connected substantially at points respectively $\frac{1}{3}$ and $\frac{2}{3}$ of its length to corresponding points on said high voltage winding.

8. A transformer as defined in claim 3, said varistor elements comprising zinc oxide varistors.

9. A transformer as defined in claim 1 in which said tank contains a dielectric oil and in which said windings and said varistor means are located within said tank and are immersed in said dielectric oil.

* * * * *